(12) United States Patent
Kornblum

(10) Patent No.: US 10,018,301 B2
(45) Date of Patent: Jul. 10, 2018

(54) DRAIN VALVE

(71) Applicant: CONTROL DEVICES, LLC, Fenton, MO (US)

(72) Inventor: Thomas M. Kornblum, Eureka, MO (US)

(73) Assignee: Control Devices, LLC, Fenton, MO (US)

( * ) Notice: Subject to any disclaimer, the term of this patent is extended or adjusted under 35 U.S.C. 154(b) by 49 days.

(21) Appl. No.: 15/235,418

(22) Filed: Aug. 12, 2016

(65) Prior Publication Data

US 2018/0045369 A1    Feb. 15, 2018

(51) Int. Cl.
*F16T 1/22* (2006.01)
*F16T 1/38* (2006.01)

(52) U.S. Cl.
CPC ............. *F16T 1/22* (2013.01); *F16T 1/383* (2013.01); *F16T 1/386* (2013.01)

(58) Field of Classification Search
CPC ..... F16T 1/20; F16T 1/22; F16T 1/386; F16T 1/383; F16T 1/45
USPC .................................................. 137/171–202
See application file for complete search history.

(56) References Cited

U.S. PATENT DOCUMENTS

| | | | |
|---|---|---|---|
| 2,186,923 A | 1/1940 | Hooper et al. | |
| 2,629,458 A | 2/1953 | Allen et al. | |
| 2,677,386 A | 5/1954 | Wilkerson | |
| 2,999,509 A | 9/1961 | Hankison et al. | |
| 3,203,245 A | 8/1965 | Smallpeice | |
| 3,269,403 A | 8/1966 | Smallpeice | |
| 3,275,020 A | 9/1966 | Fujiwara | |
| 3,318,323 A * | 5/1967 | Pearson | F16T 1/20 137/195 |
| 3,378,993 A | 4/1968 | Veres et al. | |
| 3,418,789 A | 12/1968 | Hoffman et al. | |
| 3,495,617 A | 2/1970 | Zifferer | |
| 3,507,098 A | 4/1970 | Veres et al. | |
| 3,980,457 A | 9/1976 | Smith | |
| 3,992,941 A | 11/1976 | McGoldrick | |
| 3,993,090 A | 11/1976 | Hankison | |
| 4,082,107 A | 4/1978 | Hoffman et al. | |

(Continued)

FOREIGN PATENT DOCUMENTS

| EP | 1130308 A2 | 9/2001 |
|---|---|---|
| EP | 2910867 A1 | 8/2015 |

(Continued)

*Primary Examiner* — Ian Paquette
(74) *Attorney, Agent, or Firm* — Senniger Powers LLP

(57) ABSTRACT

A drain valve including a housing having a float chamber, a piston chamber, and a plenum communicating with the piston chamber through a seat. The housing has a liquid inlet passage, and an outlet port. The drain valve has a tube passage communicating with the piston chamber. The drain valve includes an annular float. The drain valve includes a seal body connected to the float and rising away from the tube passage when liquid is in the float chamber. The drain valve includes a piston slidably mounted in the piston chamber having a head that moves away from the seat when gas enters the piston chamber. The piston includes a valve element that moves as the piston head moves to expose the liquid inlet port and allow liquid to flow from the liquid inlet passage through the plenum and into the liquid outlet passage.

20 Claims, 10 Drawing Sheets

(56) References Cited

U.S. PATENT DOCUMENTS

| | | | |
|---|---|---|---|
| 4,112,968 A | 9/1978 | Hoffman et al. | |
| 4,136,009 A | 1/1979 | Samiran | |
| 4,729,328 A | 3/1988 | Shellenberger | |
| 4,779,640 A | 10/1988 | Cummings et al. | |
| 4,823,827 A | 4/1989 | Olejak | |
| 5,014,735 A | 5/1991 | Cummings | |
| 5,103,855 A | 4/1992 | Chuang | |
| 5,115,798 A | 5/1992 | Moore, Jr. et al. | |
| 5,146,947 A | 9/1992 | Vetrini | |
| 5,365,969 A | 11/1994 | Edwards | |
| 5,636,655 A | 6/1997 | Kawamura et al. | |
| 5,769,911 A | 6/1998 | Van De Vijvere | |
| 5,983,919 A | 11/1999 | Ottinger et al. | |
| 9,273,838 B2 * | 3/2016 | Tanaka | F21K 9/00 |
| 2007/0006918 A1 | 1/2007 | Yamamoto | |
| 2007/0137706 A1 | 6/2007 | Stamatakis et al. | |
| 2017/0016573 A1 * | 1/2017 | Doki | F16T 1/20 |

FOREIGN PATENT DOCUMENTS

| | | | |
|---|---|---|---|
| FR | 2107774 A5 | 5/1972 |
| GB | 1387750 A | 3/1975 |
| JP | H1163388 A | 3/1999 |

\* cited by examiner

DRAIN VALVE

BACKGROUND

The present invention generally relates to drain valves, and more particularly, to an automatic drain valve having a simplified structure.

Liquid condensate forms in many gaseous fluid handling systems. In order to ensure proper system operation, the condensate is usually separated from the gas (e.g., by gravity) and collected along with solid foreign materials in a reservoir. The accumulated liquid and materials are periodically discharged to prevent the reservoir from becoming too full, causing system backup or reservoir overflow.

Various drain systems have been used to discharge the liquid and foreign materials. One such drain system is described in U.S. Pat. No. 5,983,919, which is incorporated by reference. Typically, the drain system is connected to the reservoir. A float in the system rises and falls in response to the liquid level in the reservoir. When the float rises to a predetermined maximum level, the drain valve opens. In many cases, the float opens a pneumatic valve that permits gas in a float chamber to actuate a drain valve separate from the float chamber to drain the accumulated liquid and foreign materials. Often filtered and dried shop air is used as the pressurized gas.

Many systems have a float chamber mounted between an upper body and a lower body. The upper body has an air inlet and an air outlet separated by a magnetically actuated valve. A float in the float chamber has a magnet that ensures the valve is closed when liquid in the float chamber is below a certain level. When a sufficient amount of liquid enters the float chamber, the float magnet opens the valve, allowing air to travel from the air inlet to the air outlet. External tubing transports the air from the air outlet to a piston mounted in the lower body. The lower body also has passages connecting a liquid inlet to a liquid outlet via the float chamber. The piston controls an external valve mounting in piping connected to the liquid outlet, allowing liquid to pass from the liquid inlet to the piping connected to the liquid outlet.

Thus, it is evident that these prior art systems had housing assemblies with numerous inlets and outlets, a few lengths of external tubing or piping, and a remote liquid valve connected to a piston that were potentially exposed to damage. Accordingly, there is a need for a drain valve that has fewer inlets and outlets, tubing and piping, and remote valve and exposed pistons.

SUMMARY

In one aspect, an automatic drain valve is used in combination with a fluid system having pressurized gas system and a liquid collection reservoir. The automatic drain valve comprises a housing having a float chamber, a piston chamber positioned lower than the float chamber extending between a head end and a seat end, and a plenum fluidly communicating with the seat end of the chamber through a valve seat. The housing also has a liquid inlet passage adapted for fluid communication with the liquid collection reservoir and extending to a liquid inlet port adjacent the valve seat and a liquid outlet passage extending from a liquid outlet port at the plenum to a liquid outlet opening in the housing. Further, the housing has a float chamber passage fluidly communicating the float chamber with the liquid inlet passage, and a pressurized gas inlet passage adapted for fluid communication with the pressurized gas system and extending to a gas inlet port at the float chamber. In addition, the automatic drain valve comprises a tube extending upward into the float chamber and having a tube passage extending downward from an upper port at an upper end of the tube and fluidly communicating with the piston chamber, and an annular float having a central opening sized for receiving the tube. The float is buoyant in liquid so the float moves up and down along the tube as the float rises and falls in the float chamber, respectively, in response to liquid flowing into and out of the float chamber. Further, the automatic drain valve comprises a seal body operatively connected to the float and positioned above the upper end of the tube so the seal body rests on the upper end of the tube when liquid is absent from the float chamber to block the upper port of the tube passage to prevent pressurized gas in the float chamber from entering the tube passage and rises away from the upper end of the tube passage when a predetermined amount of liquid is present in the float chamber to unblock the upper port of the tube passage to permit pressurized gas in the float chamber to pass through the tube passage to the piston chamber. The automatic drain valve also comprises a piston slidably mounted in the piston chamber and biased toward the seat end of the piston chamber. The piston includes a head positioned between the gas inlet port and the head end of the piston chamber so the piston moves away from the valve seat when pressurized gas enters the piston chamber through the gas inlet port. Further, the piston includes a valve element operatively connected to the head. The valve element moves within the valve seat as the piston head moves away from the valve seat to expose the liquid inlet port and allow liquid to flow from the liquid inlet passage through the plenum and into the liquid outlet passage.

In another aspect an automatic drain valve for use in combination with a pressurized gas system having a liquid collection reservoir. The automatic drain valve comprises a housing having a float chamber, a piston chamber positioned below the float chamber, and a plenum fluidly communicating with the chamber through a valve seat. The housing also has a liquid inlet passage adapted for fluid communication with the liquid collection reservoir and extending to a liquid inlet port adjacent the valve seat and a liquid outlet passage extending from a liquid outlet port at the plenum to a liquid outlet opening in the housing. The liquid outlet port extends parallel to and non-coaxial with the liquid inlet passage. Further, the housing has a float chamber passage fluidly communicating the float chamber with the liquid inlet passage, and a liquid inlet passage adapted for fluid communication with the liquid collection reservoir and extending to a liquid inlet port adjacent the valve seat. In addition, the automatic drain valve comprises a pressurized gas inlet passage adapted for fluid communication with the pressurized gas system and extending to a gas inlet port at the float chamber. The automatic drain valve also comprises a tube extending upward into the float chamber and having a tube passage extending downward from an upper port at an upper end of the tube to the piston chamber. The tube extends perpendicular to the liquid inlet passage and the liquid outlet passage. Further, the automatic drain valve comprises an annular float having a central opening sized for receiving the tube. The float is buoyant in liquid so the float moves up and down along the tube as the float rises and falls in the float chamber, respectively, in response to liquid flowing into and out of the float chamber. The automatic drain valve further comprises a seal body operatively connected to the float and positioned above the upper end of the tube so the seal body rests on the upper end of the tube when liquid is absent from the float chamber to block the upper port of the tube passage to prevent pressurized gas in the float chamber from entering the tube passage and rises away from the upper end of the tube passage when a predetermined amount of liquid is present in the float chamber to unblock the upper port of the tube passage to permit pressurized gas in the float chamber to pass through the tube passage to the piston chamber. In addition, the automatic drain valve comprises a piston head slidably mounted in the piston chamber so the piston moves in the piston chamber when pressurized gas enters the piston chamber through the gas inlet port, and a valve element operatively connected to the piston head. The valve element moves within the valve seat as the piston head moves away from the valve seat to allow liquid to flow from the liquid inlet passage through the plenum and into the liquid outlet passage.

Other aspects of the present invention will be apparent in view of the following description and claims.

BRIEF DESCRIPTION OF THE DRAWINGS

Corresponding reference characters indicate corresponding parts throughout the drawings.

DETAILED DESCRIPTION OF THE DRAWINGS

Figure 1:
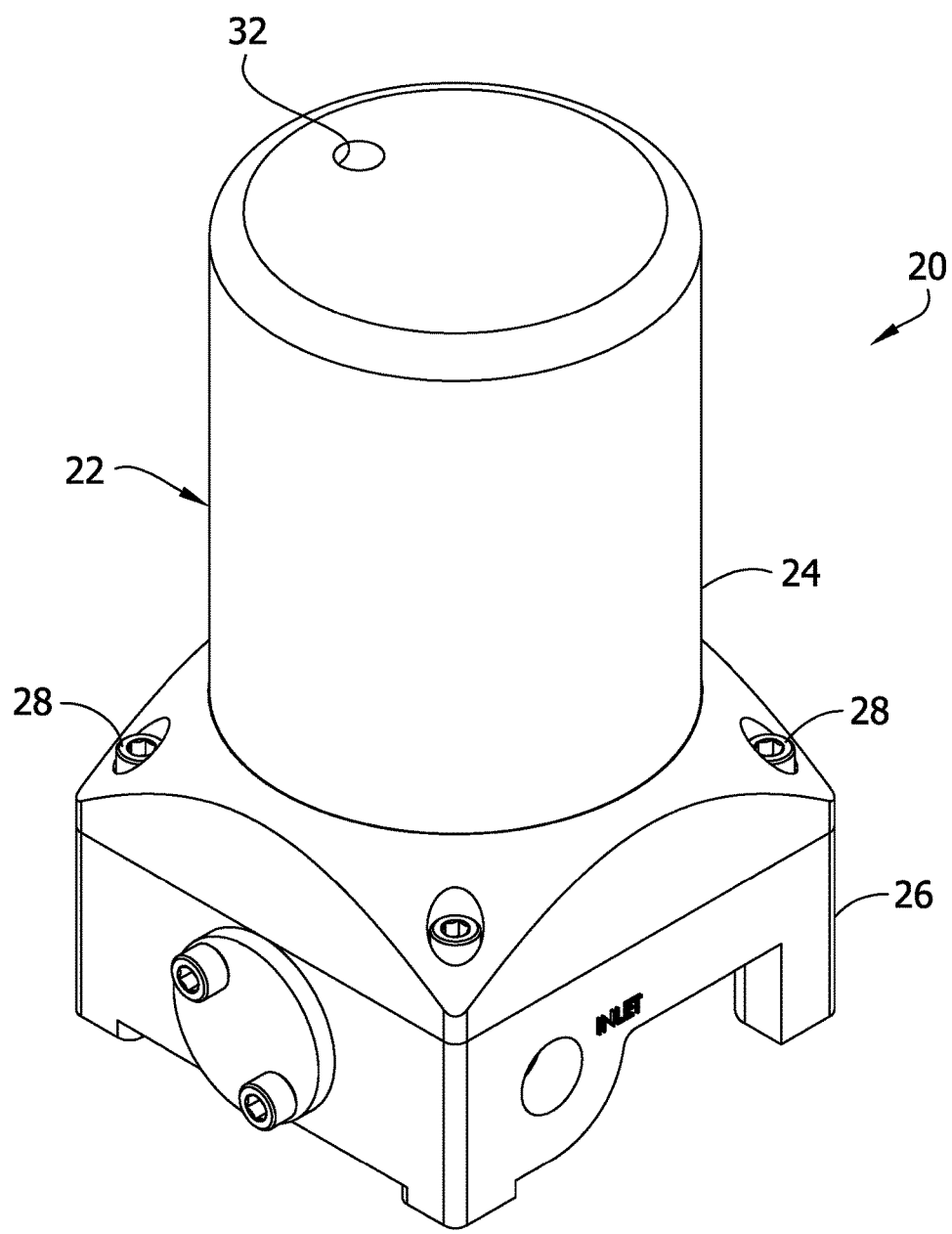
FIG. 1 is a perspective of an automatic drain valve.
Figure 2:
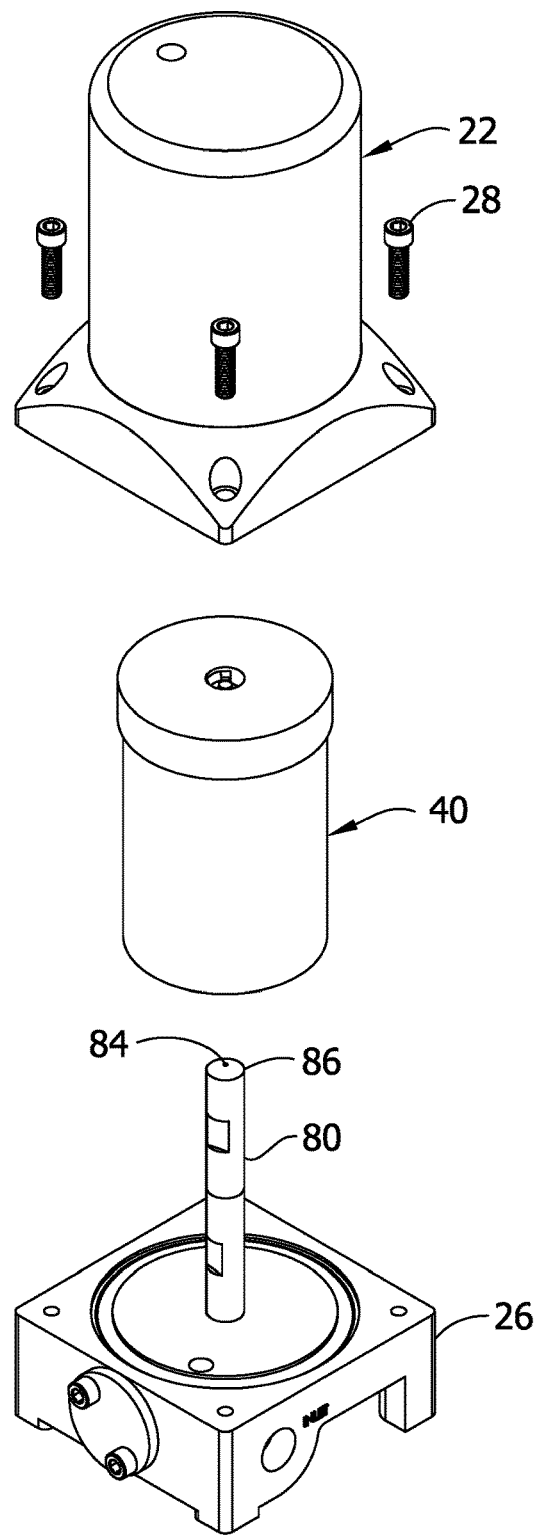
FIG. 2 is a partially separated perspective of the valve.
Figure 3:
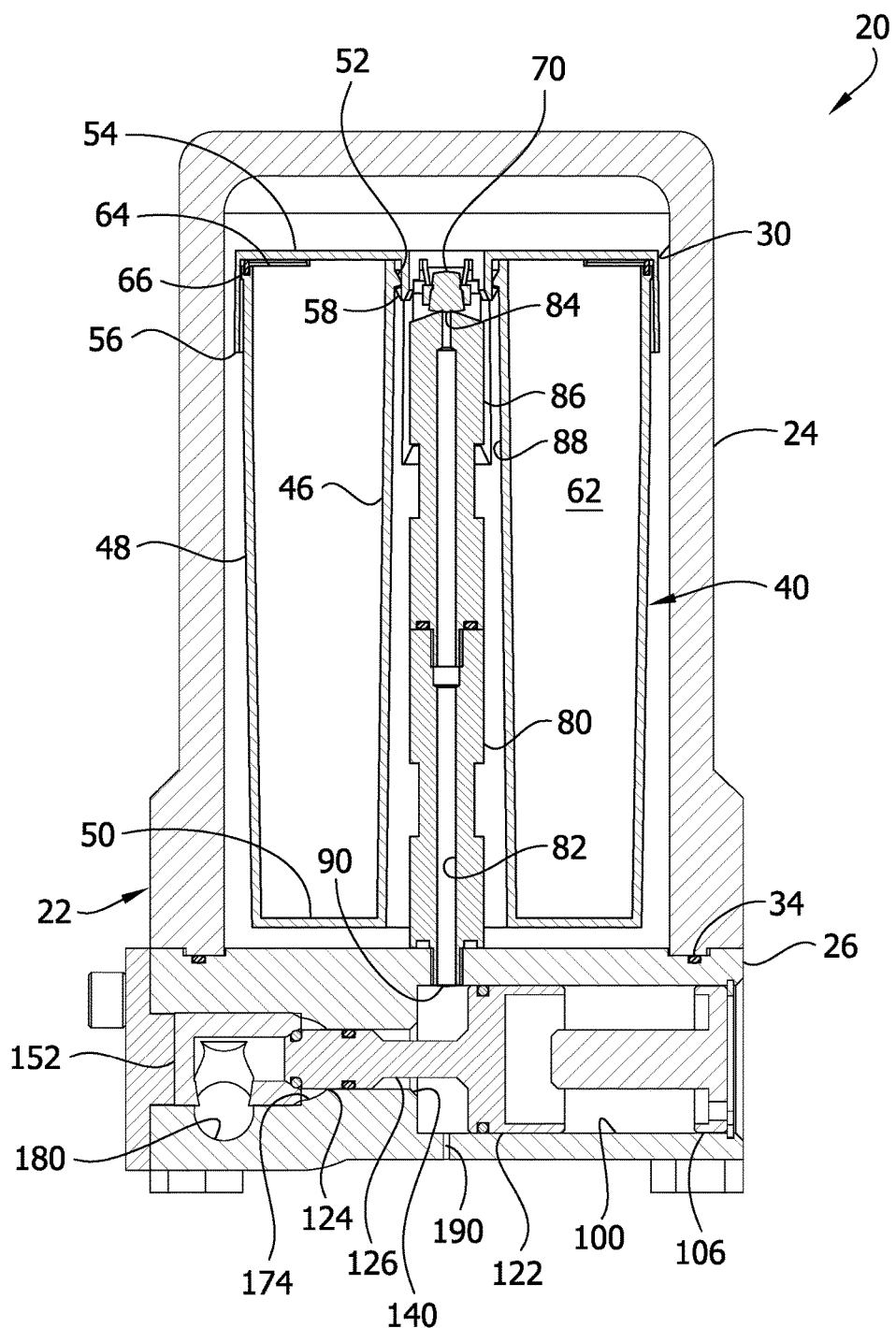
FIG. 3 is a vertical cross section taken through a piston centerline.

Referring to FIGS. 1 and 2, an automatic drain valve is designated in its entirety by the reference number 20. The drain valve 20 includes a housing, generally designated by 22, consisting of a cover 24 fastened to a base 26. Although the cover 24 may be fastened to the base 26 using other means, in one example bolts 28 are used. As shown in FIG. 3, the cover 24 and base 26 define a float chamber 30. An opening 32 is provided in the cover 24. The opening 32 (FIG. 1) is adapted to connect with a pressurized gas line (not shown) to introduce pressurized gas into the float chamber 30. An O-ring seal 34 is provided between the cover 24 and the base 26 to prevent fluid from leaking through the corresponding interface. The pressurized gas may be system gas or shop air. The float chamber 30 is sized and shaped for receiving a float (FIG. 3), generally designated by 40.

Figure 4:
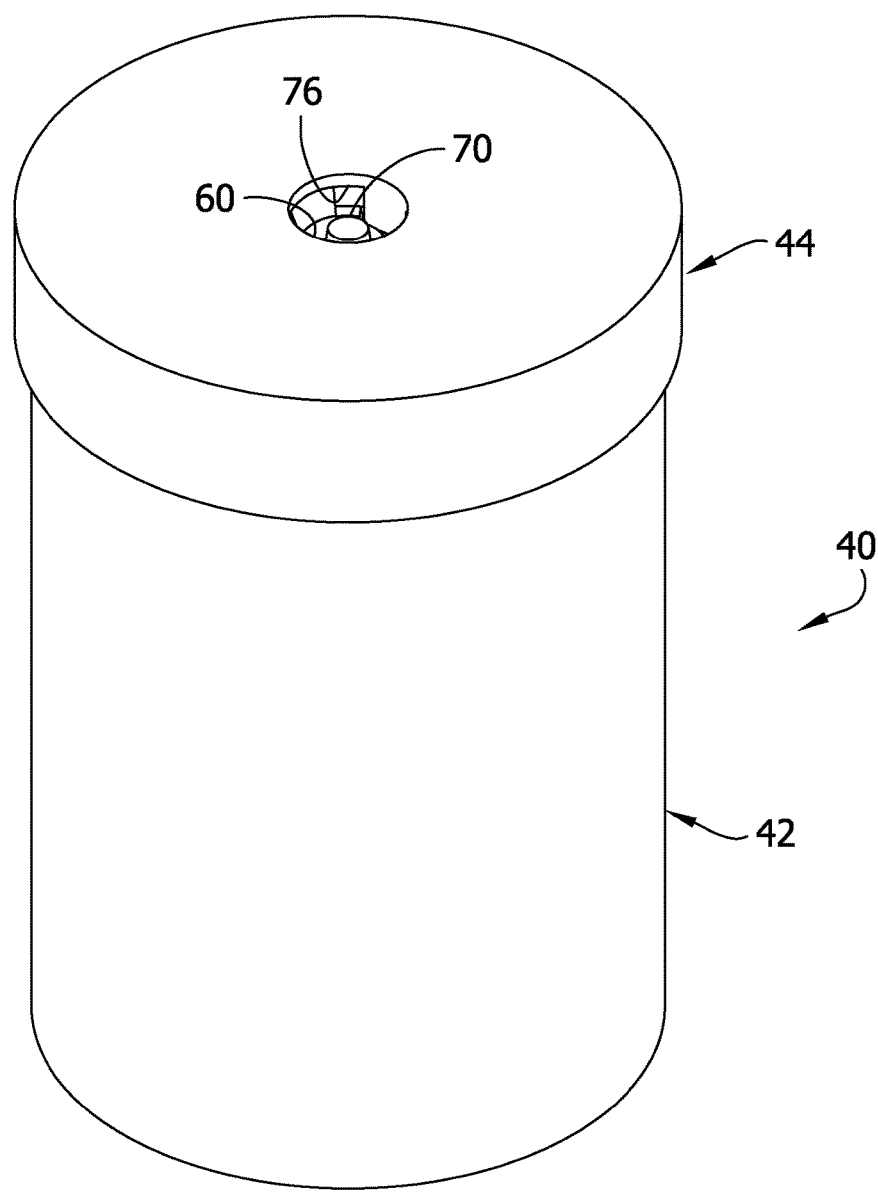
FIG. 4 is a perspective of a float of the valve.

As illustrated in FIGS. 3 and 4, the float 40 consists of an annular shell, generally designated by 42, and a lid, generally designated by 44. The annular shell 42 includes cylindrical inner and outer sidewalls, 46, 48, respectively, joined by annular bottom 50. A rib 52 is formed near an upper end of the inner sidewall 46 for joining the lid 44 to the shell 42. The lid 44 includes a top 54 having an outer wall 56. Hooked arms 58 downward from a central opening 60 of the lid 44. These arms 58 engage the rib 52 of the shell 42 when the lid 44 is pushed downward onto the shell to hold the lid on the shell, creating a hollow interior 62 inside the float 40. As shown in FIG. 3, the diameter of the outer wall 56 of the lid 44 is larger than the diameter of the outer sidewall 48 of the shell 42 so an air pocket is created around the interface between the lid 44 and the shell 42 when the float 40 is floating in liquid. As will be appreciated by those skilled in the art, the air pocket isolates the liquid from the interface to prevent liquid from entering the hollow interior 62 of the float 40. However, a gap 64 maintained between the lid 44 and shell 42 permits gas to enter and exit the hollow interior 62 of the float 40. As pressure inside the float chamber 30 increases, gas flows into the hollow interior 62 through the gap 64 to equalize pressure inside the float 40 with pressure inside the float chamber. As a result, the float 40 can withstand high gas operating pressures (e.g., 200 psi or more). In the illustrated example, the float 40 includes a seal 66 to prevent liquid from traveling through the gap 64. Other types of floats are envisioned. For example, conventional solid floats may be used in the drain valve.

Figure 5:
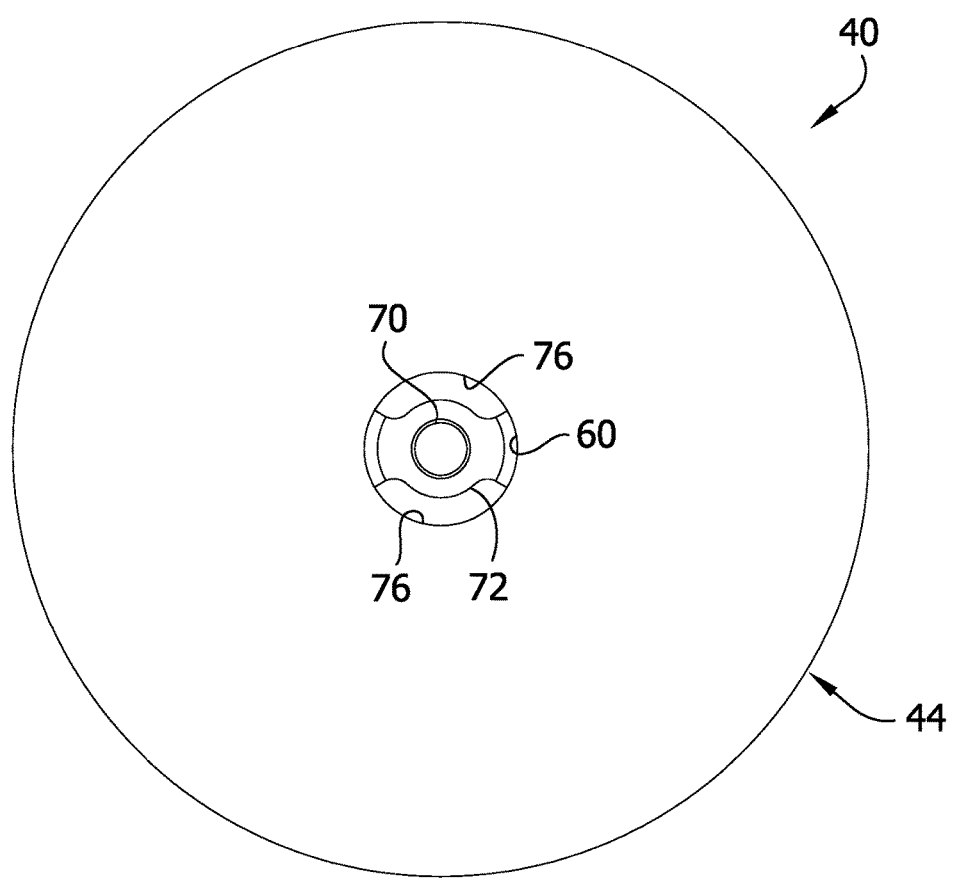
FIG. 5 is a top plan of the float.

As illustrated in FIG. 5, a seal body 70 is centered in the lid 44 by a band 72 extending inward into a central opening 74 of the lid. The band 72 allows air to pass through openings 76 between the lid 44 and the seal body 70 as will be explained below. Although the seal body 70 may be made of other materials, in one example the seal body is made from elastomeric polymer.

Returning to FIGS. 2 and 3, a tube 80 having a tube passage 82 extends upward into the cover 22 from the housing base 24. The tube passage 82 extends upward to an upper port 84 at an upper end 86 of the tube 80. The inner sidewall 46 of the float shell 42 defines a central opening 88 sized for receiving the tube 80. The weight of the float 40 and volume of the hollow interior 62 are sized so that the float is buoyant in a liquid for which the drain valve 20 is designed. Thus, the float 40 moves up and down along the tube 80 as the float rises and falls in the float chamber 30 in response to liquid flowing into and out of the float chamber. When the float 40 moves down along the tube 80, the seal body 70 rests on the upper end 86 of the tube, blocking gas flow through the upper port 84 to the tube passage 82. When a predetermined amount of liquid is present in the float chamber 30, the float 40 and seal body 70 rise, separating the seal body from the upper end 86 of the tube 40 and permitting gas in the float chamber 30 to pass through the upper port 84 and into the tube passage 82.

Figure 6:
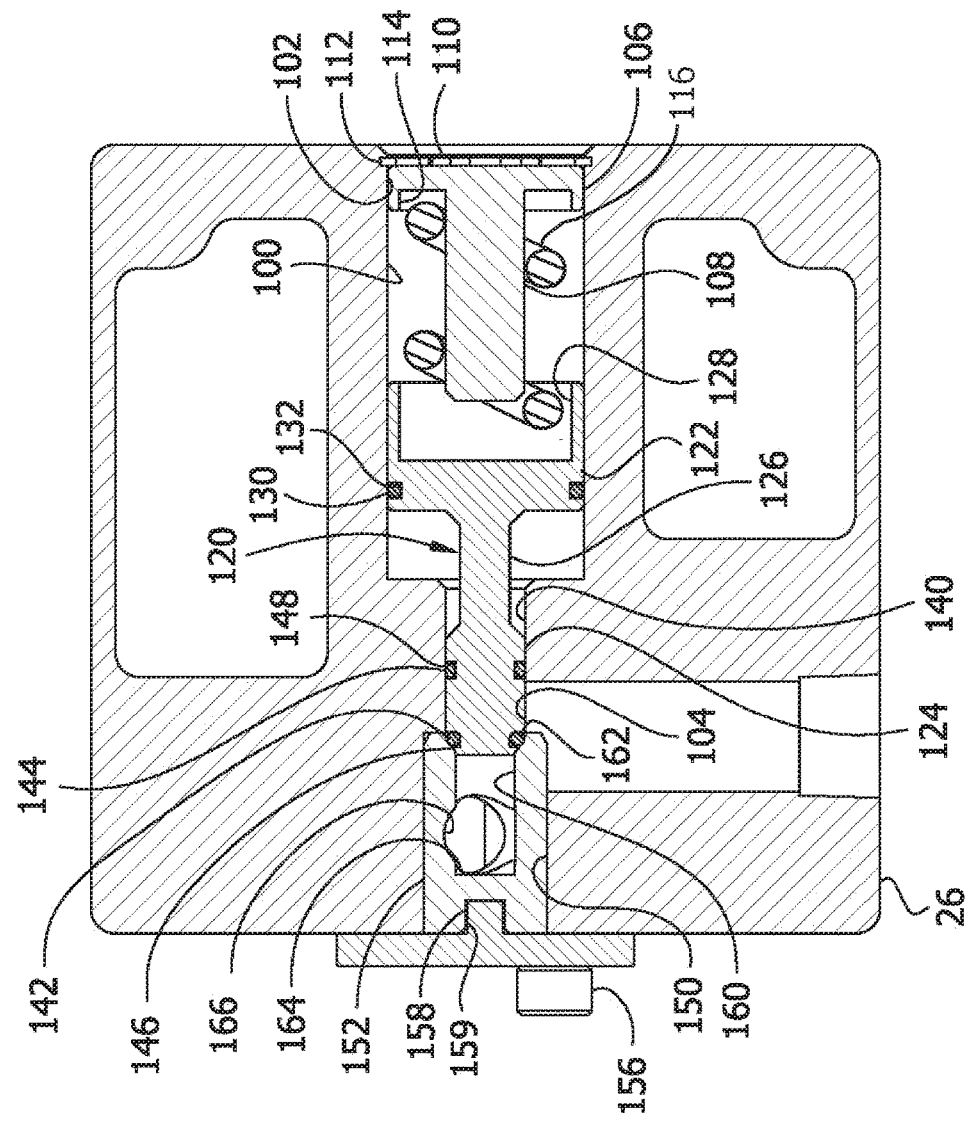
FIG. 6 is a top down horizontal cross section taken through the piston centerline.

As shown in FIG. 3, the tube passage 82 extends downward into the housing base 26 to a gas inlet port 90 entering a piston chamber 100 positioned below the float chamber 30. As shown in FIG. 6, the piston chamber 100 extends between a head end 102 and a seat end 104 opposite the head end. A plug 106 having a central stop 108 is positioned in the piston chamber 100 at the head end 102. Although other means may be used to hold the plug 106 in position, in one example a split ring retainer 110 is mounted in a groove 112 formed at the head end 102 of the piston chamber 100. A skirt 114 surrounds the central stop 108 for centering a coil spring 116 on the plug 106.

As further illustrated in FIG. 6, a piston, generally designated by 120, is slidably mounted in the piston chamber 100. The piston 120 has a head 122 and a valve element 124 connected by a central rod 126. The head 122 is positioned between the gas inlet port 90 (FIG. 3) and the head end 102 of the piston chamber 100. The head 122 includes a skirt 128 facing the plug 106 for centering the coil spring 116 in the head. The coil spring 116 is sized to bias the piston 120 toward the seat end 104 of the piston chamber 100 and maintain the plug 106 in position abutting the retainer 110. An O-ring seal 130 is mounted in a groove 132 formed in the head 122 for sealing an interface between the head and the piston chamber 100. As pressurized air enters the piston chamber 100 through the gas inlet port 90, the piston 120 moves toward the head end 102 of the piston chamber.

The piston chamber 100 has a reduced diameter section 140 at its seat end 104, forming a cylindrical valve seat that slidably receives the piston valve element 124. A pair of annular O-ring seals 142, 144 is mounted in grooves 146, 148 formed in the valve element 124 for sealing an interface between the valve element and reduced diameter section 140 of the piston chamber 100. The reduced diameter section 140 ends at an enlarged diameter bore 150 sized for receiving an insert 152. The insert 152 is held in the bore 150 of the housing base 26 by a cap 154. Although the cap 154 may be fastened to the base 26 by other means, in one example the cap is fastened to the base by screw fasteners 156. The cap 154 has a rib 158 that engages a corresponding slot 159 in the insert 152 for ensuring the insert is properly oriented in the bore 150.

Figure 7:
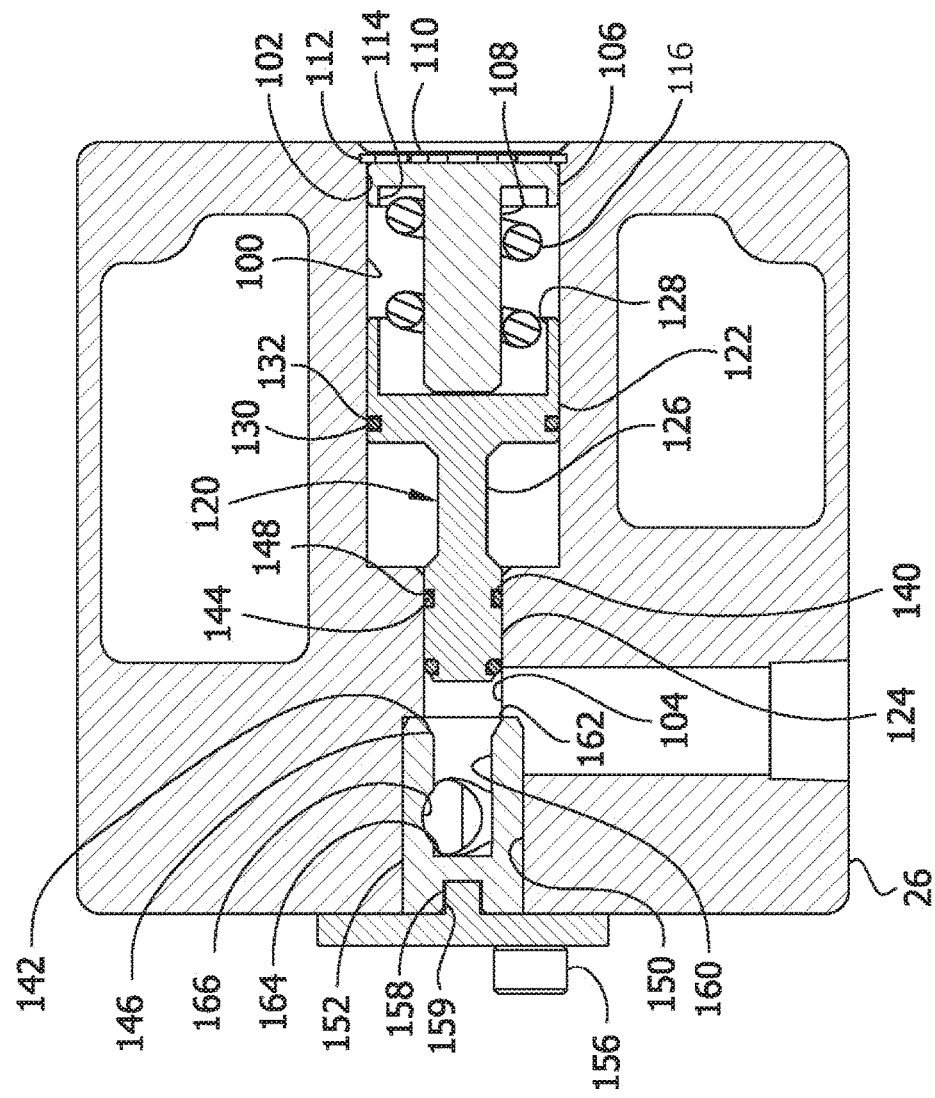
FIG. 7 is a separated horizontal cross section similar to FIG. 6.
Figure 8:
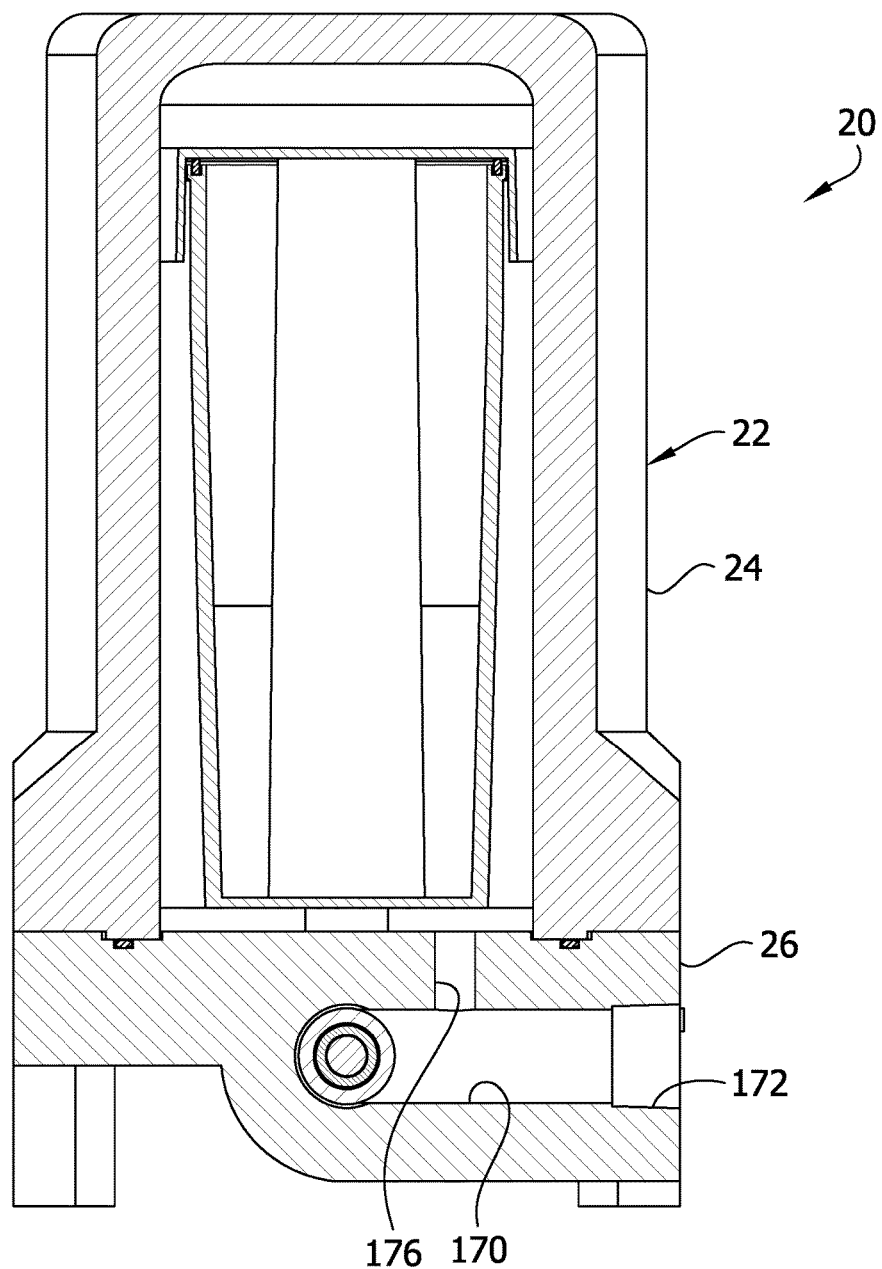
FIG. 8 is a vertical cross section taken through a liquid inlet passage.
Figure 9:
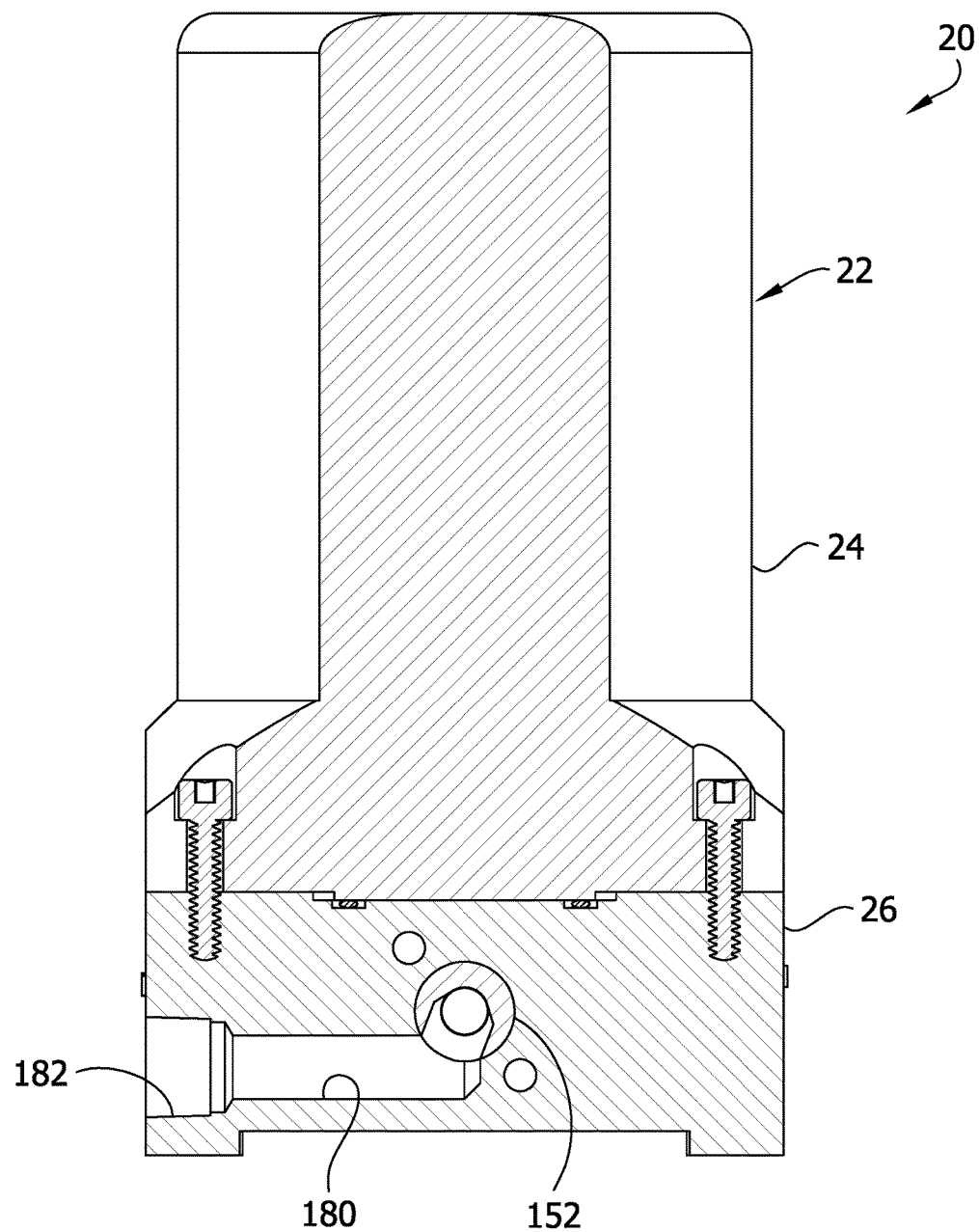
FIG. 9 is a vertical cross section taken through a liquid outlet passage.

As also shown in FIGS. 6 and 7, the insert 152 has a central bore 160 extending along an imaginary central axis from a conical valve seat 162 at one end and a closed end 164 at the other. A transverse bore 166 extends perpendicular to the central axis adjacent the closed end 164. Together, the central bore 160 and the transverse bore 166 of the insert 152 form a plenum. As shown in FIG. 8, a liquid inlet passage 170 extends through the housing base 26 from an inlet 172 at an exterior of the base to a liquid inlet port 174 (FIG. 3) that partially overlaps the reduced diameter section 140 of the piston chamber 100. The insert 152 partially overlaps the liquid inlet passage 170 so the effective liquid inlet port 174 is semicircular. The liquid inlet passage 170 and valve seat 162 are aligned with the central axis of the insert 152. The O-ring seals 142, 144 on the valve element 124 are positioned on opposite sides of the liquid inlet port 174 when the O-ring seal 132 engages the conical valve seat 162. A float chamber drain passage 176 extends between the float chamber 30 and the liquid inlet passage 170. The inlet 172 is adapted to connect with an upstream liquid drain line (not shown) such as a condensate reservoir. As further illustrated in FIG. 9, a liquid outlet passage 180 extends through the housing base 26 from the transverse bore 166 of the insert 134 to an outlet 182 at the exterior the base. The outlet 182 is adapted to connect to a downstream liquid drain line (not shown). The liquid inlet passage 170 and liquid outlet passage 180 are parallel and non-coaxial. Further, the piston chamber 100 and the tube 80 are perpendicular to each other, as well as, perpendicular to the liquid inlet passage 170 and liquid outlet passage 180. Additionally, in one example the liquid outlet passage 180 is positioned lower than the liquid inlet passage 170 so that liquid drains by gravity toward the liquid outlet passage.

In operation, the inlet 172 of the drain valve 20 is connected to a reservoir (not shown) and the outlet 182 is connected to a drain (not shown). The opening 32 in the housing cover 24 is connected to a process gas line, or alternatively shop air. When no liquid has traveled from the reservoir to the inlet 172, the drain valve 20 is configured as shown in FIG. 3 with the seal body 70 resting on the upper end 86 of the tube 80 and blocks the upper port 84, preventing process gas in the flow chamber 30 from entering the tube passage 82. A small orifice 190 extending between the piston chamber 100 and an exterior of the housing body 26 allows gas pressure in the piston chamber to equalize with ambient pressure. Without a pressure differential across the piston head 122 the coil spring 116 biases the piston 120 toward the seat end 104 of the piston chamber 100 until the piston valve element 124 seats against the conical valve seat 162. In this position, the piston valve element 124 blocks the liquid inlet port 174 so liquid cannot pass. As liquid fills the reservoir and travels through the inlet 172 to the liquid inlet passage 170, liquid cannot pass through the liquid inlet port 174. Liquid, seeking a level equivalent to that in the reservoir, passes through the flow chamber drain passage 176 to the float chamber 30.

Figure 10:
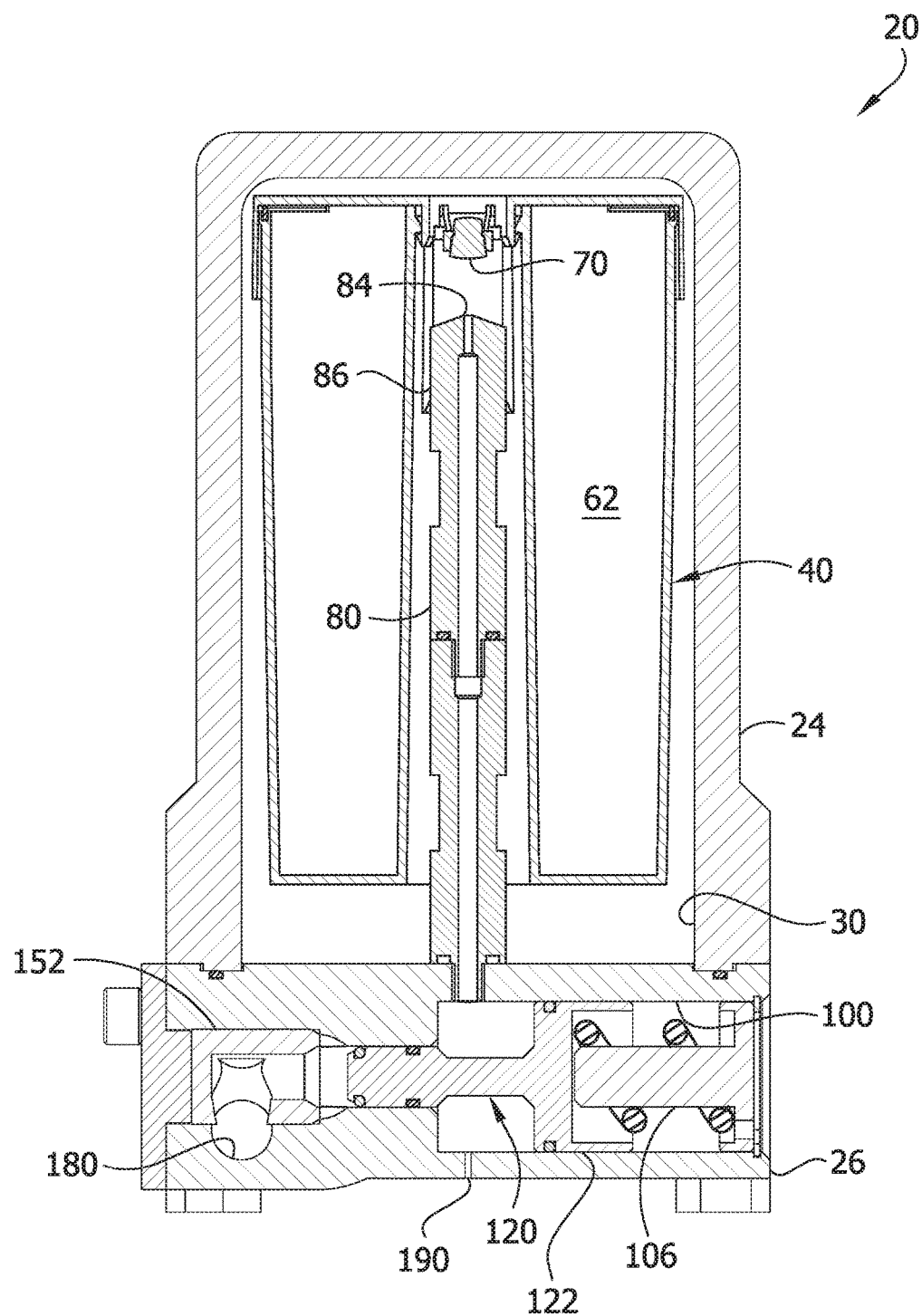
FIG. 10 is a vertical cross section similar to FIG. 3 but having the float and piston in alternative positions.

When sufficient liquid enters the float chamber 30, the buoyant float 40 rises, lifting the seal body 70 from the upper port 84 and allowing gas to travel through the openings 76 and the tube passage 82 to the piston chamber 100. The orifice 190 prevents immediate pressure discharge so a pressure differential builds across the head 122 of the piston 120, overcoming the spring 116 and forcing the head toward the head end 102 of the piston chamber 100 until it engages the stop 108 of the plug as shown in FIG. 10. When this occurs, the piston valve element 124 moves away from the valve seat 162, unblocking the liquid inlet port 174 so liquid travels from the inlet passage 170 through the plenum formed in the insert 152 to the outlet passage 180 and eventually through the outlet 182. As liquid travels through the liquid inlet passage 170, liquid drains through the flow chamber drain passage 176, through the plenum in the insert 152, and ultimately through the outlet 182. When sufficient liquid has drained from the flow chamber 30, the float 40 falls so the seal body 70 rests on the upper port 84 and the drain valve 20 returns to the configuration shown in FIG. 3.

As will be appreciated by those skilled in the art, the drain valve 20 described above may use either shop air or process to move the piston 120 in the chamber 100. Further, the float 40 withstands high operating pressures by balancing gas pressure inside and outside the float, and prevents liquid from entering the hollow interior 62 of the float. Moreover, the single-acting piston 120 having the integrated head 22 and valve element 124 eliminates the need for external valves, piston rods, and tubing.

Having described the invention in detail, it will be apparent that modifications and variations are possible without departing from the scope of the invention defined in the appended claims.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:
1. An automatic drain valve for use in combination with a fluid system having pressurized gas system and a liquid collection reservoir, said automatic drain valve, comprising:
a housing having:
 a) a float chamber,
 b) a piston chamber positioned lower than the float chamber extending between a head end and a seat end,
 c) a plenum fluidly communicating with the seat end of the piston chamber through a valve seat,
 d) a liquid inlet passage adapted for fluid communication with the liquid collection reservoir and extending to a liquid inlet port adjacent the valve seat,
 e) a liquid outlet passage extending from a liquid outlet port at the plenum to a liquid outlet opening in the housing, f) a float chamber passage fluidly communicating the float chamber with the liquid inlet passage, and g) a pressurized gas inlet passage adapted for fluid communication with the pressurized gas system and extending to a gas inlet port at the float chamber;

a tube extending upward into the float chamber and having a tube passage extending downward from an upper port at an upper end of the tube and fluidly communicating with the piston chamber;

an annular float having a central opening sized for receiving the tube, the float being buoyant in liquid so the float moves up and down along the tube as the float rises and falls in the float chamber, respectively, in response to liquid flowing into and out of the float chamber;

a seal body operatively connected to the float and positioned above the upper end of the tube so the seal body rests on the upper end of the tube when liquid is absent from the float chamber to block the upper port of the tube passage to prevent pressurized gas in the float chamber from entering the tube passage and rises away from the upper end of the tube passage when a predetermined amount of liquid is present in the float chamber to unblock the upper port of the tube passage to permit pressurized gas in the float chamber to pass through the tube passage to the piston chamber; and a piston slidably mounted in the piston chamber and biased toward the seat end of the piston chamber, the piston including:

a) a head positioned between the gas inlet port and the head end of the piston chamber so the piston moves away from the valve seat when pressurized gas enters the piston chamber through the gas inlet port, and b) a valve element operatively connected to the head, the valve element moving within the valve seat as the piston head moves away from the valve seat to expose the liquid inlet port and allow liquid to flow from the liquid inlet passage through the plenum and into the liquid outlet passage.

2. An automatic drain valve as set forth in claim 1, wherein the annular float has a hollow interior to provide the float buoyancy in liquid.

3. An automatic drain valve as set forth in claim 1, wherein the seal body is positioned in the central opening of the annular float.

4. An automatic drain valve as set forth in claim 3, wherein a gas passage between the seal body and the central opening of the float permits gas to flow into the tube passage through the upper port of the tube when the seal body is spaced from the upper port.

5. An automatic drain valve as set forth in claim 3, wherein the seal body is positioned at an upper end of the central opening of the float.

6. An automatic drain valve as set forth in claim 1, further comprising a pair of annular seals surrounding the valve element of the piston, wherein when a first seal of the pair of annular seals engages the valve seat on a first side of the liquid inlet port, a second seal of the pair of annular seals is positioned on a second side of the liquid inlet port opposite said first side.

7. An automatic drain valve as set forth in claim 6, further comprising a spring positioned between the head of the piston and the head end of the piston chamber to bias the piston toward the seat end of the piston chamber.

8. An automatic drain valve as set forth in claim 7, further comprising a ring seal surrounding the head for sealing an interface between the head and the piston chamber.

9. An automatic drain valve as set forth in claim 1, wherein the liquid inlet passage and the liquid outlet passage are parallel.

10. An automatic drain valve as set forth in claim 9, wherein the plenum is defined by a tubular insert having a central axis, the insert having the valve seat formed at one end of the insert and a closed end opposite the valve seat, the insert having a bore extending perpendicular to a central axis adjacent the closed end, the bore opening into the liquid outlet passage.

11. An automatic drain valve as set forth in claim 10, wherein the liquid inlet passage and valve seat are aligned with the central axis of the insert.

12. An automatic drain valve as set forth in claim 11, wherein the liquid outlet passage is positioned below the central axis of the insert.

13. An automatic drain valve for use in combination with a pressurized gas system having a liquid collection reservoir, said automatic drain valve, comprising:

a housing having:

a) a float chamber, b) a piston chamber positioned below the float chamber, c) a plenum fluidly communicating with the piston chamber through a valve seat, d) a liquid inlet passage adapted for fluid communication with the liquid collection reservoir and extending to a liquid inlet port adjacent the valve seat, e) a liquid outlet passage extending from a liquid outlet port at the plenum to a liquid outlet opening in the housing, said liquid outlet port extending parallel to and non-coaxial with said liquid inlet passage, f) a float chamber passage fluidly communicating the float chamber with the liquid inlet passage, and g) a pressurized gas inlet passage adapted for fluid communication with the pressurized gas system and extending to a gas inlet port at the float chamber;

a tube extending upward into the float chamber and having a tube passage extending downward from an upper port at an upper end of the tube to the piston chamber, said tube extending perpendicular to the liquid inlet passage and the liquid outlet passage;

an annular float having a central opening sized for receiving the tube, the float being buoyant in liquid so the float moves up and down along the tube as the float rises and falls in the float chamber, respectively, in response to liquid flowing into and out of the float chamber;

a seal body operatively connected to the float and positioned above the upper end of the tube so the seal body rests on the upper end of the tube when liquid is absent from the float chamber to block the upper port of the tube passage to prevent pressurized gas in the float chamber from entering the tube passage and rises away from the upper end of the tube passage when a predetermined amount of liquid is present in the float chamber to unblock the upper port of the tube passage to permit pressurized gas in the float chamber to pass through the tube passage to the piston chamber;

a piston head slidably mounted in the piston chamber so the piston moves in the piston chamber when pressurized gas enters the piston chamber through the gas inlet port; and a valve element operatively connected to the piston head, the valve element moving within the valve seat as the piston head moves away from the valve seat to allow liquid to flow from the liquid inlet passage through the plenum and into the liquid outlet passage.

14. An automatic drain valve as set forth in claim 13, wherein the annular float has a hollow interior to provide the float buoyancy in liquid.

15. An automatic drain valve as set forth in claim 13, wherein the seal body is positioned in at an upper end of the central opening of the annular float.

16. An automatic drain valve as set forth in claim 15, wherein a gas passage between the seal body and the central opening of the float permits gas to flow into the tube passage through the upper port of the tube when the seal body is spaced from the upper port.

17. An automatic drain valve as set forth in claim 13, wherein the plenum is defined by a tubular insert having a central axis, the insert having the valve seat formed at one end of the insert and a closed end opposite the valve seat, the insert having a bore extending perpendicular to a central axis adjacent the closed end, the bore opening into the liquid outlet passage.

18. An automatic drain valve as set forth in claim 17, wherein the liquid inlet passage and valve seat are aligned with the central axis of the insert.

19. An automatic drain valve as set forth in claim 17, wherein the liquid inlet passage and valve seat are aligned with the central axis of the insert.

20. An automatic drain valve as set forth in claim 19, wherein the liquid outlet passage is positioned below the central axis of the insert.

\* \* \* \* \*